(12) United States Patent
Nelson

(10) Patent No.: US 11,898,634 B1
(45) Date of Patent: Feb. 13, 2024

(54) BELT TENSION IDLER DEVICE

(71) Applicant: Michael E. Nelson, Jonesboro, AR (US)

(72) Inventor: Michael E. Nelson, Jonesboro, AR (US)

(*) Notice: Subject to any disclaimer, the term of this patent is extended or adjusted under 35 U.S.C. 154(b) by 275 days.

(21) Appl. No.: 16/862,309

(22) Filed: Apr. 29, 2020

Related U.S. Application Data

(60) Provisional application No. 62/839,913, filed on Apr. 29, 2019.

(51) Int. Cl.
*F16H 7/08* (2006.01)
*F16H 7/12* (2006.01)

(52) U.S. Cl.
CPC .......... *F16H 7/08* (2013.01); *F16H 7/0838* (2013.01); *F16H 7/1245* (2013.01); *F16H 2007/081* (2013.01); *F16H 2007/0842* (2013.01); *F16H 2007/0844* (2013.01); *F16H 2007/0865* (2013.01); *F16H 2007/0893* (2013.01)

(58) Field of Classification Search
CPC ........ F16H 7/02; F16H 7/08; F16H 2007/081; F16H 2007/0863; F16H 2007/0865; F16H 2007/0893; F16H 2007/0842; F16H 2007/0844; F16H 2007/087; F16H 7/10; F16H 7/12; F16H 7/1209; F16H 7/1245; F16H 7/1254; F16H 7/1281; F16H 7/0838
See application file for complete search history.

(56) References Cited

U.S. PATENT DOCUMENTS

| | | | | |
|---|---|---|---|---|
| 4,069,719 A | * | 1/1978 | Cancilla | B62M 9/16 474/134 |
| 4,454,236 A | * | 6/1984 | Foster | F16H 7/0848 474/101 |
| 4,504,254 A | * | 3/1985 | Foster | F16H 7/1245 29/452 |
| 4,521,208 A | * | 6/1985 | Doveri | F16H 7/1281 123/90.19 |
| 4,525,152 A | * | 6/1985 | Speer | F16H 7/1245 267/140.4 |
| 4,571,223 A | * | 2/1986 | Molloy | F16H 7/1281 474/135 |
| 4,696,663 A | * | 9/1987 | Thomey | F16H 7/1218 474/133 |
| 4,934,988 A | * | 6/1990 | Kawamura | F16H 7/1218 474/117 |
| 5,122,098 A | * | 6/1992 | Kanehira | F16H 7/0834 474/111 |

(Continued)

FOREIGN PATENT DOCUMENTS

| | | | | |
|---|---|---|---|---|
| CN | 109611522 A | * | 4/2019 | |
| EP | 1158287 A2 | * | 11/2001 | F16H 7/08 |
| KR | 20210119038 A | * | 10/2021 | F16H 7/08 |

*Primary Examiner* — Michael R Mansen
*Assistant Examiner* — Raveen J Dias
(74) *Attorney, Agent, or Firm* — Schrantz Law Firm, PLLC; Stephen D. Schrantz

(57) ABSTRACT

The belt tension idler device increases tension on a belt. A mounting foot secures the belt tension idler to a vehicle. A rotating head that extends from the body of the device contacts the belt to maintain tension against the belt. A tensioning spring biases the device to maintain tension on the belt. The tension reduces slack thereby reducing vibrations from the belt and maintaining proper alignment of the belt.

17 Claims, 9 Drawing Sheets

(56) References Cited

U.S. PATENT DOCUMENTS

| | | | | |
|---|---|---|---|---|
| 5,256,113 A | * | 10/1993 | Bushman | F02B 67/06 |
| | | | | 474/135 |
| 5,352,160 A | * | 10/1994 | Sakai | F16H 7/1227 |
| | | | | 474/135 |
| 5,480,358 A | * | 1/1996 | Sakai | F16H 7/1227 |
| | | | | 474/135 |
| 5,489,243 A | * | 2/1996 | Watanabe | F01L 1/02 |
| | | | | 123/192.2 |
| 5,518,459 A | * | 5/1996 | Sakai | F16H 7/1227 |
| | | | | 474/133 |
| 6,001,037 A | * | 12/1999 | Rocca | F16H 7/1218 |
| | | | | 474/112 |
| 2003/0216203 A1 | * | 11/2003 | Oliver | F16H 7/1281 |
| | | | | 474/134 |
| 2004/0063531 A1 | * | 4/2004 | Cura | F16H 7/1281 |
| | | | | 474/135 |
| 2004/0097311 A1 | * | 5/2004 | Smith | F16H 7/1281 |
| | | | | 474/135 |
| 2005/0215392 A1 | * | 9/2005 | Wimmer | F02B 67/06 |
| | | | | 476/28 |
| 2009/0023528 A1 | * | 1/2009 | Dickson | F16H 7/1281 |
| | | | | 474/135 |
| 2011/0207568 A1 | * | 8/2011 | Smith | F16H 7/1281 |
| | | | | 474/135 |
| 2012/0178563 A1 | * | 7/2012 | Lee | F16H 7/1281 |
| | | | | 474/110 |
| 2016/0230853 A1 | * | 8/2016 | Harvey | F16H 7/1281 |
| 2019/0293155 A1 | * | 9/2019 | Fukada | F16H 7/12 |
| 2020/0032884 A1 | * | 1/2020 | Gross | F01P 5/04 |

* cited by examiner

BELT TENSION IDLER DEVICE

CROSS-REFERENCE TO RELATED APPLICATIONS

This application claims priority to and is a continuation of U.S. Patent Application No. 62/839,913 filed on Apr. 29, 2019 entitled BELT TENSION IDLER DEVICE that is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to a device for tensioning a belt. More specifically, the present invention maintains tension on a belt for a vehicle, including but not limited to motorcycles, such as the Spyder Can-Am, and other vehicles driven by a belt. The present invention maintains tension on a belt to reduce vibration, reduce noise, and maintain placement of the belt. A rotating head of the device tensions a belt and maintains the tension of the belt. Bearings within the rotating head allow the head to rotate as the belt travels across the head. The belt tensioning device provides mounting apertures for mounting the device to the vehicle for positioning with the belt.

The device also provides a tensioning spring to maintain the tension applied to the belt. The tensioning spring is located at a pivot point of the device. A fastener secures the mounting leg of the device to the mounting foot at the pivot point. The fastener is inserted through a bushing aperture within a bushing of the mounting leg. In one embodiment, the bushing is constructed from a material that is impregnated with lubricant. The self-lubricating bearing forms a pivot point that self-lubricates to decrease maintenance.

Currently, belts on some vehicles vibrate excessively. Vibrations cause undesirable noise and leads to belts shifting out of place. Current devices require significant amounts of maintenance to remain in working condition. Other devices are not specifically tailored for the appropriate vehicle. Current devices also do not provide superior dampening qualities and increased durability of the present invention.

The belt tension idler device of the present invention overcomes many disadvantages of current belt tension idlers. The device provides an improved spring design that prevents the shearing of spring ends. The device also provides a self-lubricating pivot point. The body of the device is also elongated to increase dampening of the belt. Therefore, the present invention is needed to provide a user with a low maintenance belt tensioning idler device with increased functionality.

II. Description of the Known Art

Patents and patent applications disclosing relevant information are disclosed below. These patents and patent applications are hereby expressly incorporated by reference in their entirety.

U.S. Patent Publication No. 20090023528 to Dickson published on Jan. 22, 2009 (the '528 publication) teaches a motorcycle chain guide and tensioner. A chain guide and tensioner for guiding and applying tension to a chain taught by the '528 publication may include a first tensioner arm, a second tensioner arm being positioned in a spaced relationship with respect to the first arm member, a shaft member for connection to the first arm member, and a roller member including a groove for guiding the chain. The roller member taught by the '528 publication may include a pair of opposing flanges to define the groove and the height of the opposing flanges may be at least the height of the chain.

The first tensioner arm taught by the '528 publication may be biased by a biasing member, and the biasing member may include a spring. The biasing member taught by the '528 publication may include a shock absorber, and the roller member may be positioned by a collar member. The collar member taught by the '528 publication may move along a roller bushing member to adjust the roller member to be aligned with the chain, and the spring may be positioned over a spring bushing member. The spring bushing member taught by the '528 publication may maintain a spaced relationship between the first tensioner arm and the second tensioner arm, and the second tensioner arm may be connected to the vehicle. The flange taught by the '528 publication may include a chamfered edge.

U.S. Pat. No. 3,975,965 to Speer on Aug. 24, 1976 (the '965 patent) teaches a belt tensioning apparatus. A tensioning apparatus of the '965 patent is provided and utilizes the elastic properties of an elastomeric material to provide the tensioning action and such apparatus is supported adjacent the endless power transmission device to be tensioned and has components thereof operatively associated with the elastomeric material and with the device.

SUMMARY OF THE INVENTION

The belt tension idler device of the present invention dampens the vibrations of a belt and maintains proper positioning of the belt. The present invention maintains tension on a belt to reduce vibration, reduce noise, and maintain placement of the belt. The mounting foot of the device provides mounting apertures for mounting the device in relation to the belt. The device also provides a tensioning spring to apply tension to the belt. The mounting foot of the device secures to the user's vehicle.

The body provides superior dampening due to its elongated shape. A mounting leg extends from the body toward the mounting foot. A bushing is secured within the mounting leg. The bushing provides a bushing aperture through which a fastener is inserted. In one embodiment, the bushing is constructed from a material impregnated with lubricant. Impregnating the bushing with lubricant forms a pivot point that remains lubricated. The pivot point fastener inserts through the bushing aperture and a leg aperture in the mounting foot. The pivot point fastener secures the body of the device to the mounting foot.

A tensioning spring secured around the mounting leg tensions the mounting foot in relation to the body. One end of the spring inserts into a spring aperture on the body and the other end contacts a juncture with a raised edge on the mounting foot. The placement of the spring ends secures the spring in place and biases the body. The body of the device adjusts in relation to the pivot point.

A rotating head extends outward from the body of the device in the opposite direction of the mounting foot and mounting leg. A neck is inserted through a bearing aperture in the rotating head and a neck aperture in the body of the device. The neck secures the rotating head to the body.

The rotating head provides a rotating member formed in a cylindrical shape. Bearings inside the rotating head allow rotation of the rotating head. When the device of the present invention is mounted to the user's vehicle, the rotating head contacts the belt to tension the belt of the vehicle as the belt travels across the rotating head. The spring biases the rotating head to apply pressure to the belt.

Accordingly, it is an object of the present invention to reduce vibrations of a belt.

It is another object of the present invention to maintain the tension on a belt.

It is another object of the present invention to reduce the maintenance on a belt tensioning device.

It is another object of the present invention to maintain positioning of a belt.

It is another object of the invention to provide a releasably attached device to increase tension of a belt.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views?

DETAILED DESCRIPTION

Figure 1:
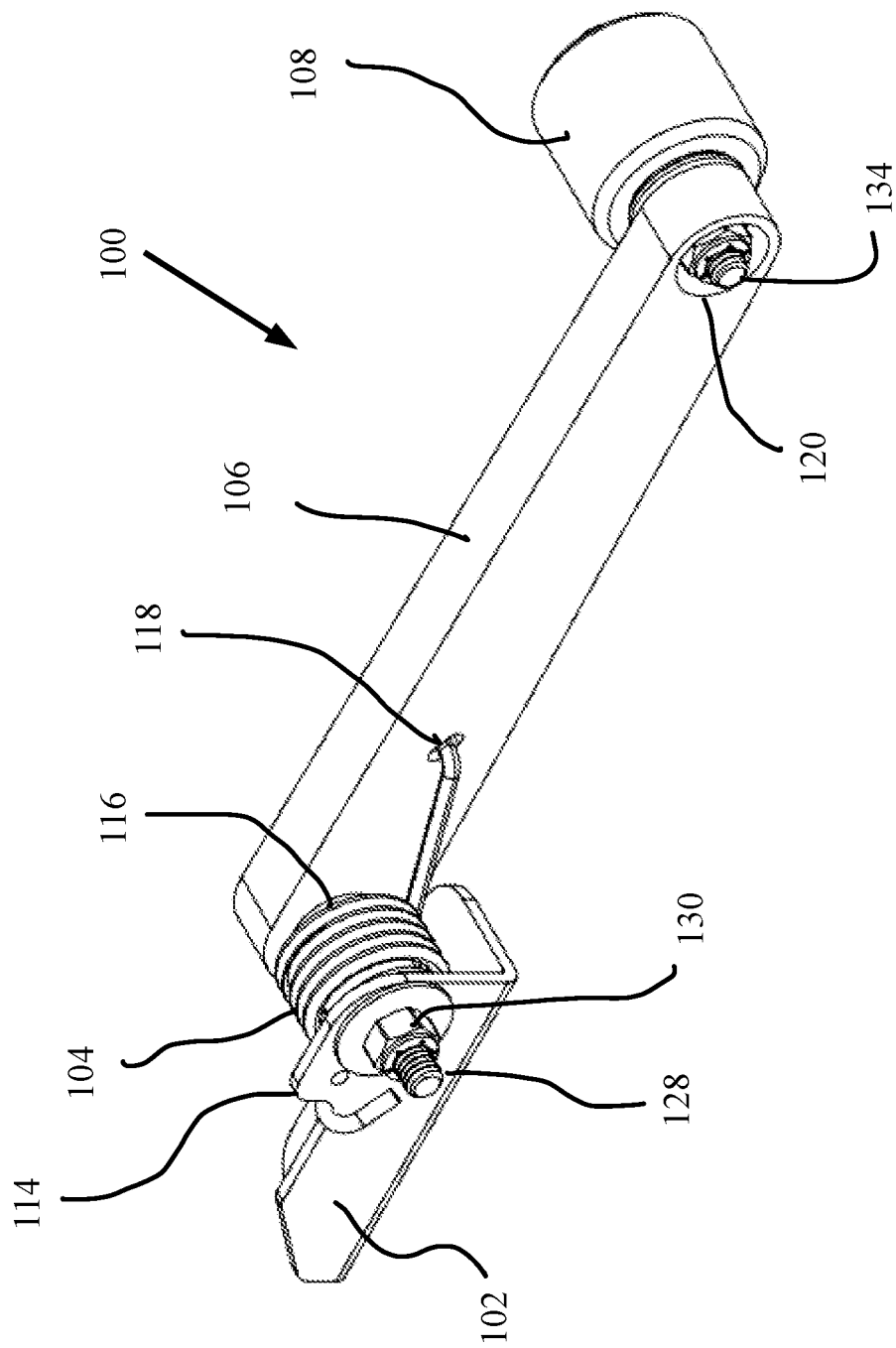
FIG. 1 is a top perspective view of one embodiment of the present invention.

The belt tension idler device 100 of the present invention dampens vibrations on a belt 136. The device 100 provides mounting foot 102, tensioning spring 104, body 106, and rotating head 108.

Figure 2:
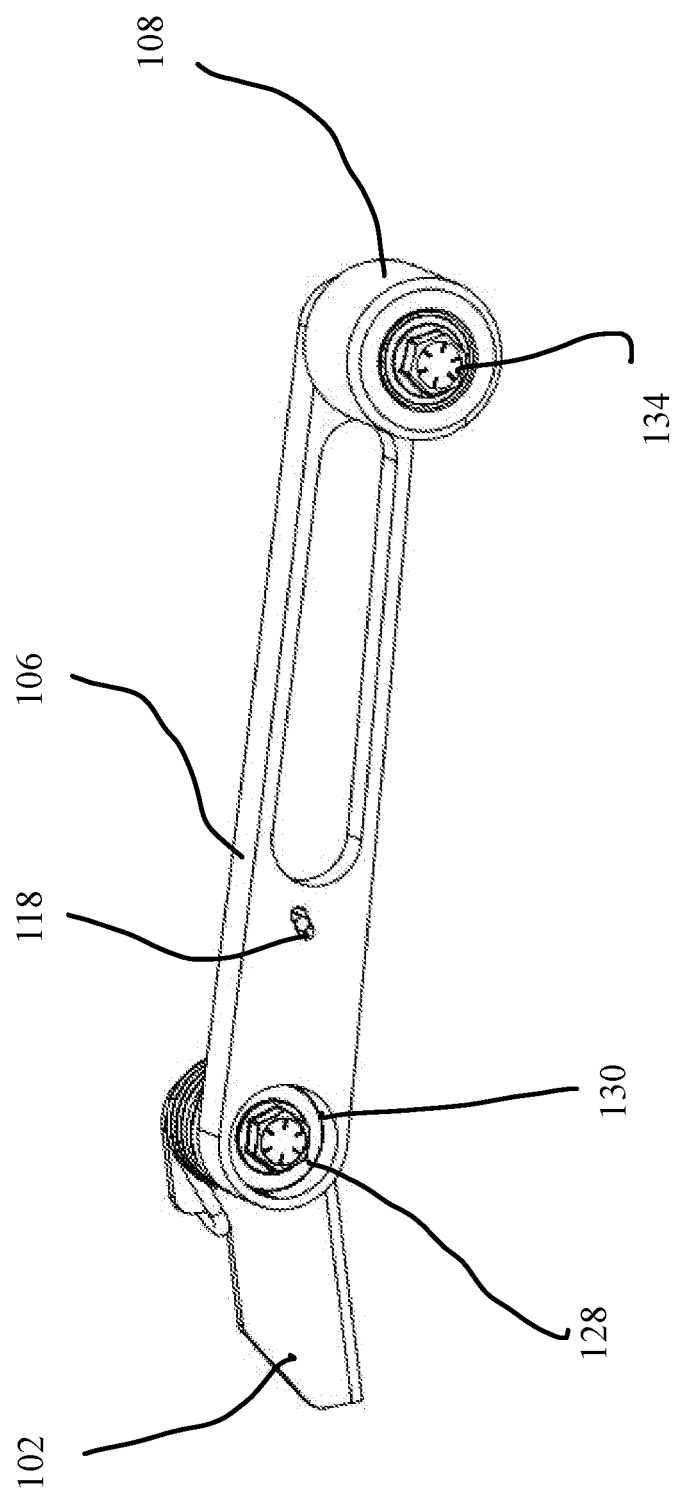
FIG. 2 is a rear view thereof.

FIGS. 1 and 2 show the belt tension idler device 100 of the present invention. Mounting foot 102 removably attaches device 100 to the user's vehicle. Fasteners inserted through mounting apertures 110 and 112 secure the mounting foot 102 to a vehicle. In one embodiment, this vehicle is a motorcycle such as a Spyder Can-Am.

Body 106 is elongated to provide dampening capabilities. The body 106 is constructed from a rigid material, such as metal or plastic. In one embodiment, the body 106 is constructed from a rigid metal, such as aluminum or billet aluminum, to increase the strength of the device.

Figure 3:
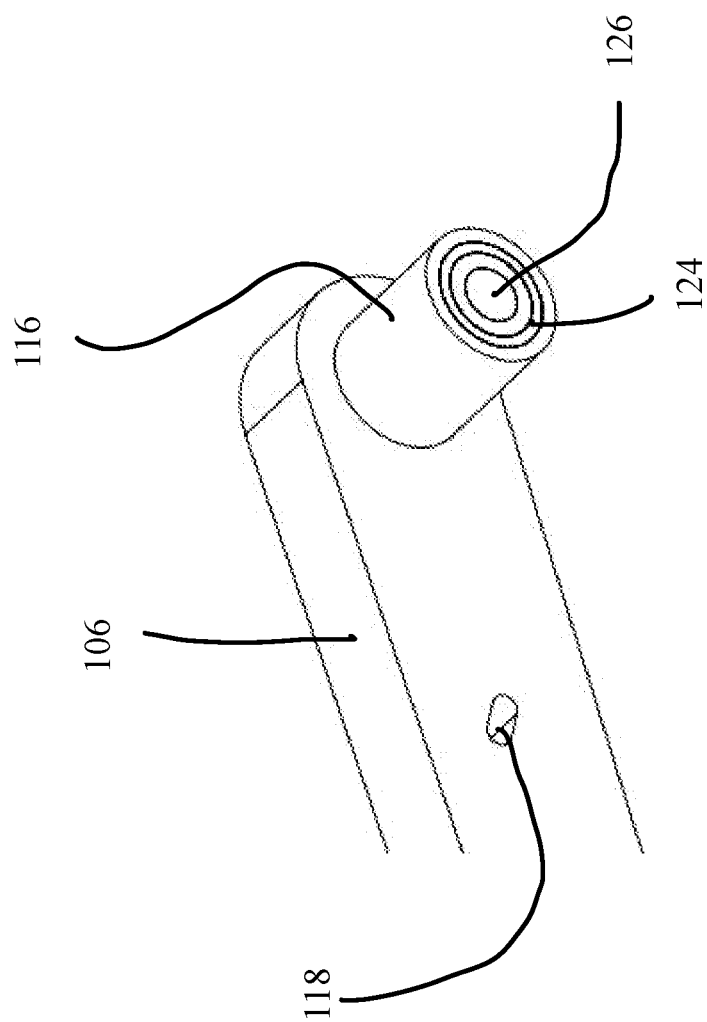
FIG. 3 is a perspective view of a mounting leg of one embodiment of the present invention.

Mounting leg 116 extends laterally away from body 106 towards mounting foot 102. Bushing 124 is located within mounting leg 116. In one embodiment, bushing 124 is impregnated with lubricant. Impregnating bushing 124 with lubricant reduces the amount of maintenance necessary to keep the device in working order. FIG. 3 shows the mounting leg 116 and bushing 122 of device 100. Bushing aperture 126 accepts pivot point fastener 128 through bushing aperture 126 and leg aperture 130. Pivot point fastener 128 secures body 106 to mounting foot 102.

Figure 4:
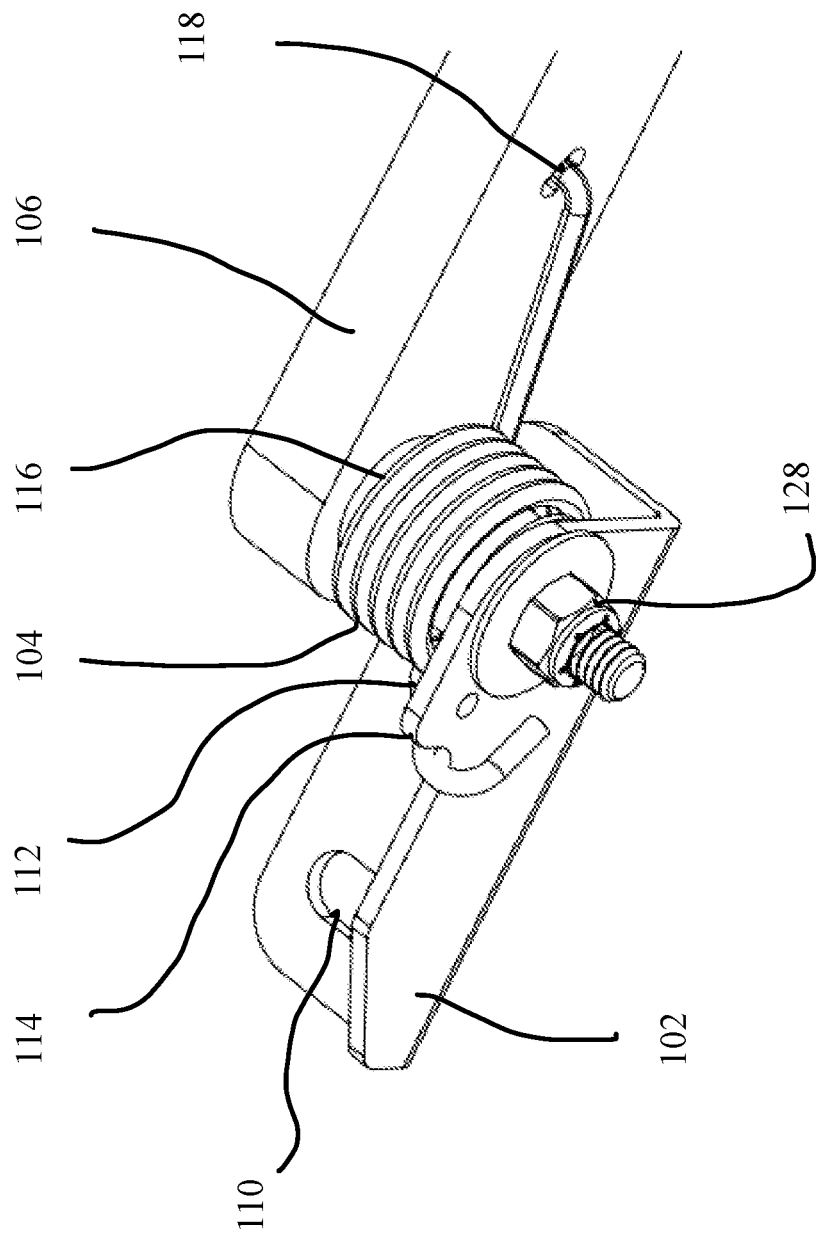
FIG. 4 is a perspective view of the pivot point of one embodiment of the present invention.

FIG. 4 shows the pivot point created at the mounting leg 116 of device 100. Tensioning spring 104 winds around mounting leg 116. Tensioning spring 104 is secured in place by feeding one end of tensioning spring 104 through spring aperture 118 of body 106 while the other end contacts a juncture with a raised edge 114 on mounting foot 102.

Mounting leg 116 and tensioning spring 104 secure to body 106 to form a pivot point. The spring biases at the pivot point to apply the appropriate amount of pressure to the belt of the user's device. The tensioning spring 104 biases the body 106 to maintain tension on the belt to absorb shock and vibration by allowing body 106 to move in relation to mounting foot 102.

Figure 5:
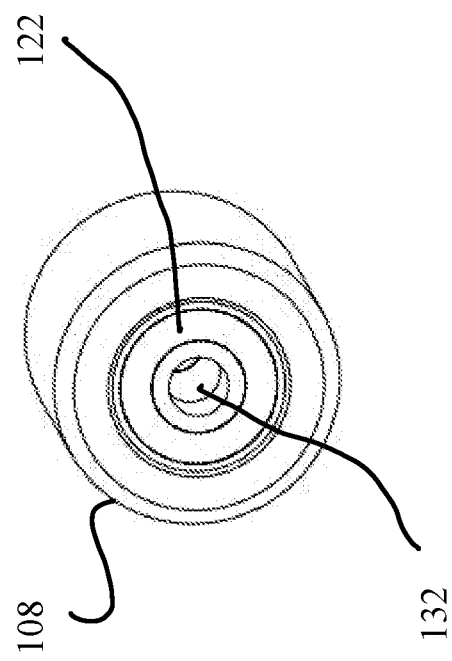
FIG. 5 is a perspective view of the rotating head of one embodiment of the present invention.
Figure 6:
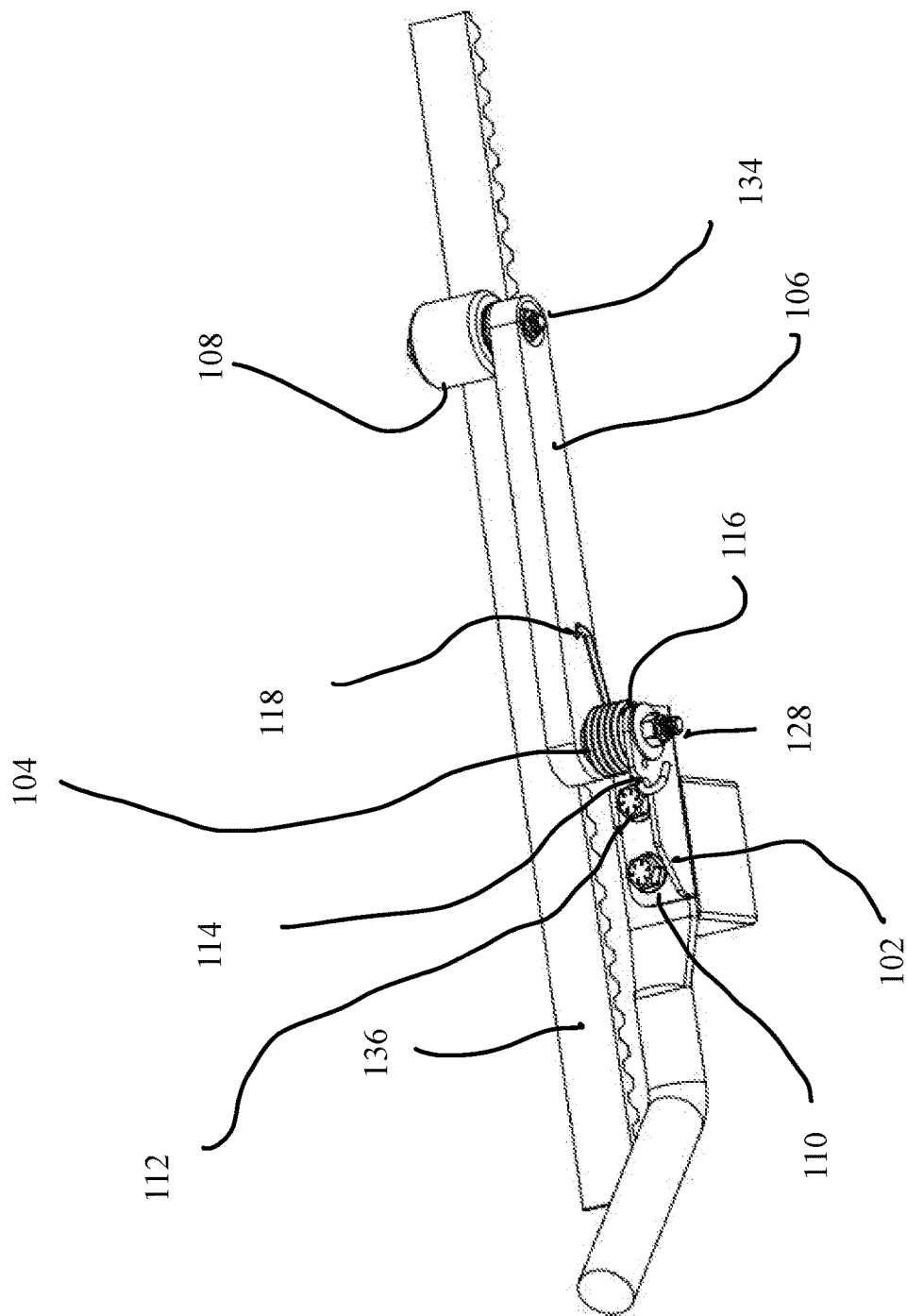
FIG. 6 is an environmental view of one embodiment of the present invention.
Figure 7:
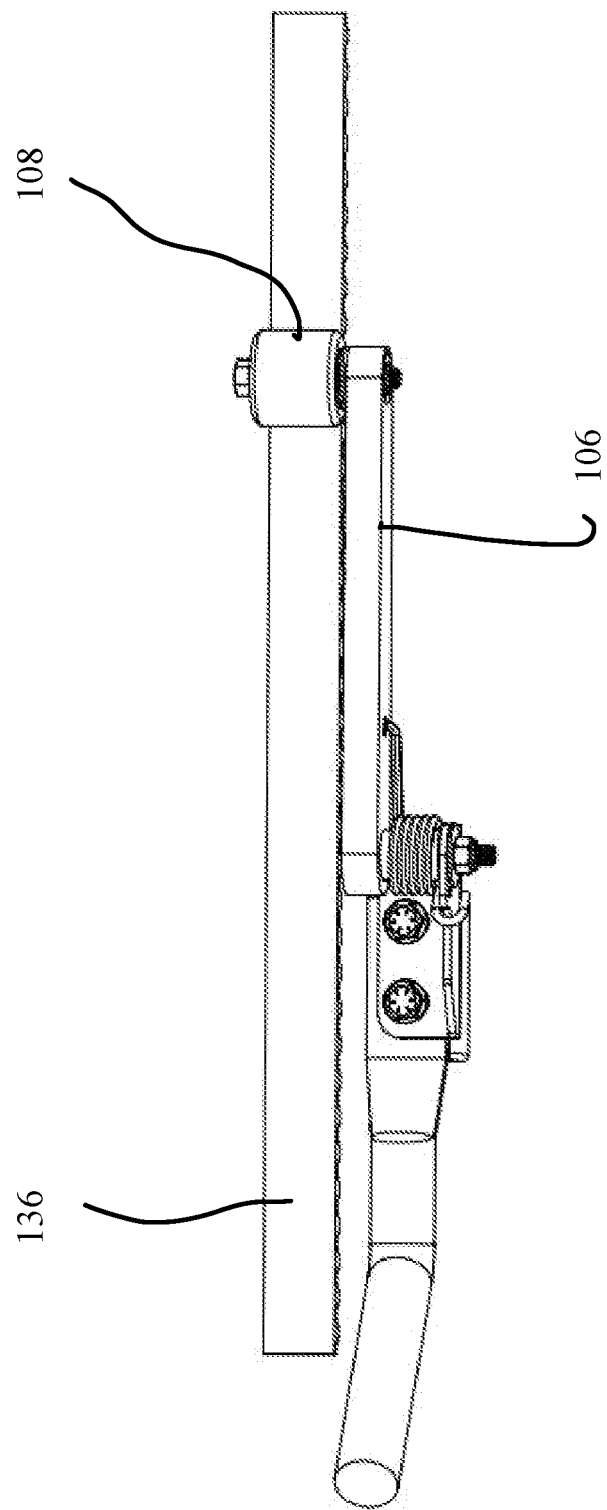
FIG. 7 is an environmental view thereof.
Figure 8:
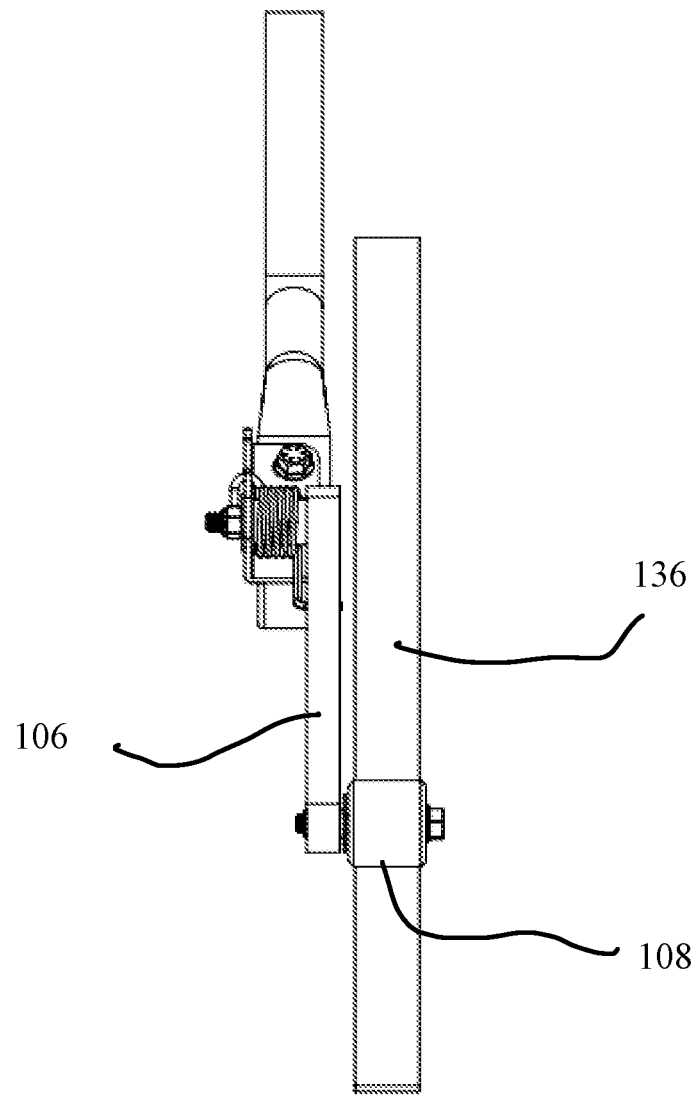
FIG. 8 is an environmental view thereof.

FIG. 5 shows one embodiment of the rotating head 108 of the present invention. Rotating head 108 provides a rotating member in a cylindrical shape with bearings 122. In one embodiment, bearings 122 are double sealed heavy duty bearings. Neck 134 secures rotating head 108 to body 106. Neck 134 inserts through bearing aperture 132 into neck aperture 120 of body 106. In one embodiment, neck aperture 120 is a threaded aperture that accepts and secures neck 134. Another embodiment secures the fastener with a nut on the end of the fastener.

The rotating head 108 is cylindrical in shape. Rotating head 108 maintains tension against the belt of the user's vehicle and rotates as the belt travels across the rotating head. Bearings 122 within rotating head 108 allow rotating head 108 to rotate around neck 134.

Figure 9:
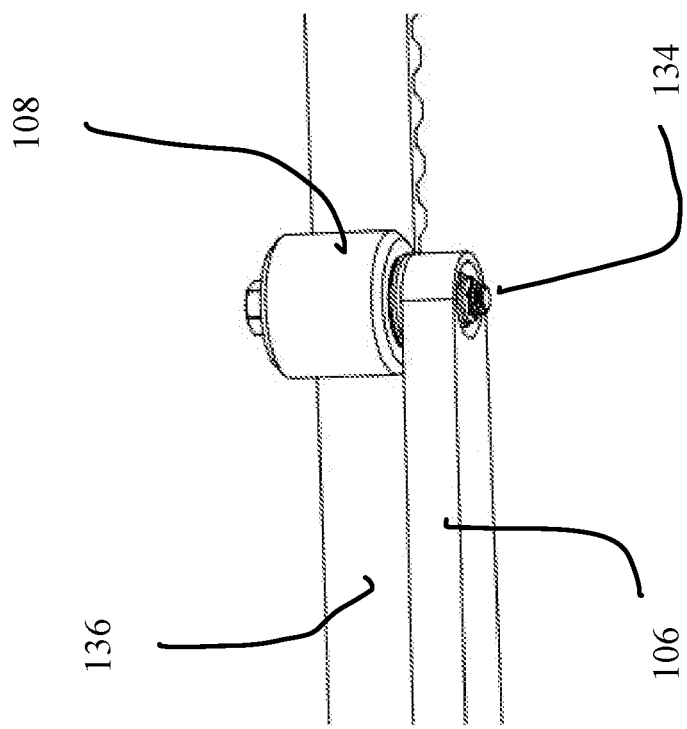
FIG. 9 is an environmental view of the rotating head of one embodiment of the present invention

FIGS. 6-9 show the belt tension idler device 100 secured to a vehicle. Mounting foot 102 secures to the user's vehicle. Body 106 extends away from mounting foot 102. Rotating head 108 rests on the belt 136 of the device. When device 100 is in use, rotating head 108 applies pressure to belt 136 to increase tension and reduce vibration. FIG. 9 shows the rotating head 108 resting on the belt 136 of the user's device. Rotating head 108 rotates as belt 136 travels across the rotating head.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A dampening device for dampening vibrations of a belt that drives a vehicle by applying tension to the belt, the dampening device comprising:
    an elongated body constructed from a rigid material, wherein the elongated body extends longitudinally;
    a mounting foot pivotally attached to a first end of the body;
    a tensioning spring secured to the body and the mounting foot, wherein the tensioning spring biases the mounting foot;
    a base of the mounting foot, wherein a bottom surface of the base is configured to secure to the vehicle;
    a mounting aperture in the base of the mounting foot that accepts a fastener inserted vertically through the mounting foot to secure the mounting foot to the vehicle; and
    a rotating head that secures to a second end of the body located opposite the mounting foot, wherein the tensioning spring biases the rotating head clockwise toward the belt to apply pressure downward on the belt, wherein the tensioning spring biases the rotating head towards the bottom surface of the base;
    wherein the body extends longitudinally, wherein the mounting foot attaches to a first side of the body located laterally of the body, wherein the rotating head attaches to a second side of the body located laterally of the body.

2. The device of claim 1, wherein the rotating head is located on an opposite side of the body as the mounting foot, wherein an outer surface of the rotating head contacts the belt, wherein the outer surface is a most radially outward surface of the rotating head that contacts the belt.

3. The device of claim 1 further comprising:
    a spring aperture located between the first end and the second end of the body, wherein the spring aperture is located longitudinally away from the first end of the body, wherein a first end of the tensioning spring inserts into the spring aperture.

4. The device of claim 3 further comprising:
    an attachment juncture of the mounting foot, wherein a second end of the tensioning spring secures to the mounting foot at the attachment juncture, wherein the attachment juncture is located at a raised edge of the mounting foot, wherein the second end of the tensioning spring biases against the raised edge of the mounting foot without insertion of the second end of the tensioning spring into a hole in the mounting foot, wherein the second end of the tensioning spring forms a hook that catches the mounting foot at the attachment juncture;
    the base of the mounting foot in which the mounting aperture is located for vertical insertion of the fastener, wherein the raised edge extends vertically upward from the base of the mounting foot.

5. The device of claim 1 further comprising:
    a mounting leg extending from the first side of the body, wherein the mounting foot pivotally attaches to the mounting leg, wherein the tensioning spring is wound around the mounting leg.

6. The device of claim 5 further comprising:
    a fastener that inserts through the mounting leg to secure the mounting foot to the body.

7. The device of claim 1 further comprising:
    a bearing within the rotating head, wherein the bearing enables rotation of the rotating head along a lateral axis, wherein the bearing is self lubricating.

8. The device of claim 7, wherein the bearing is a double sealed bearing.

9. The device of claim 8 further comprising:
    a fastener that secures the bearing and the rotating head to the body.

10. A dampening device for dampening vibrations of a belt that drives a vehicle by applying tension to the belt, the dampening device comprising:
    an elongated body constructed from a rigid material, the body defining a longitudinal axis, wherein the body extends along the longitudinal axis;
    a first end of the body located at a first longitudinal end of the body;
    a second end of the body located at a second longitudinal end of the body, wherein the first end is located opposite of the second end;
    a mounting foot pivotally attached to the first end of the body;
    a tensioning spring secured to the body and the mounting foot, wherein the tensioning spring biases the mounting foot counterclockwise;
    a first end of the tensioning spring that attaches to the body;
    a second end of the tensioning spring that forms a hook that catches a raised edge of the mounting foot without inserting the second end of the tensioning spring into a hole in the mounting foot;
    a mounting aperture in a base of the mounting foot that accepts a fastener inserted vertically through the mounting foot to secure the mounting foot to the vehicle;
    wherein the raised edge extends vertically above the base of the mounting foot and the mounting aperture; and
    a rotating head that secures to the second end of the body, wherein the tensioning spring biases the rotating head clockwise against the belt;
    wherein the mounting foot attaches to a first side of the body located laterally of the body, wherein the rotating head attaches to a second side of the body located laterally of the body, wherein the rotating head is located on an opposite side of the body as the mounting foot, wherein the rotating head is a roller that forms a cylinder.

11. The device of claim 10 further comprising:
    a spring aperture located between the first end and the second end of the body, wherein the spring aperture is located longitudinally away from the first end of the body, wherein the first end of the tensioning spring inserts into the spring aperture.

12. The device of claim 11 further comprising:
    an attachment juncture located at the raised edge of a side wall of the mounting foot, wherein the hook formed at the second end of the tensioning spring forms a U-shape to catch the raised edge of the mounting foot at the attachment juncture;
    wherein the side wall extends vertically above the base and the mounting aperture in the base, wherein the side wall accepts a fastener to secure the side wall to the elongated body.

13. The device of claim 10 further comprising:
    a mounting leg extending from the first side of the body, wherein the mounting foot pivotally attaches to the mounting leg, wherein the tensioning spring is wound around the mounting leg; and a fastener that inserts through the mounting leg to secure the mounting foot to the body.

14. The device of claim 10 further comprising:
a bearing within the rotating head, wherein the bearing enables rotation of the rotating head along a lateral axis, wherein the bearing is self lubricating; and
a fastener that secures the bearing and the rotating head to the body.

15. The device of claim 14, wherein the bearing is a double sealed bearing.

16. A dampening device for dampening vibrations of a belt that drives a vehicle by applying tension to the belt, the dampening device comprising:
an elongated body constructed from a rigid material, the body defining a longitudinal axis, wherein the body extends along the longitudinal axis;
a first end of the body located at a first longitudinal end of the body;
a second end of the body located at a second longitudinal end of the body, wherein the first end is located opposite of the second end;
a mounting foot pivotally attached to the first end of the body;
a tensioning spring secured to the body and the mounting foot, wherein the tensioning spring has a first end secured to the body and a second end secured to the mounting foot;
wherein the second end of the tensioning spring forms a hook that catches a raised edge of a side wall of the mounting foot without inserting the second end of the tensioning spring into a hole in the mounting foot;
a base of the mounting foot;
the side wall of the mounting foot that extends vertically above the base, wherein the side wall of the mounting foot accepts a fastener to secure the mounting foot to the first end of the body;
a mounting aperture in the base of the mounting foot that accepts a fastener inserted vertically downward to secure the mounting foot to the vehicle;
a rotating head that secures to the second end of the body, wherein the tensioning spring biases the rotating head downwards against the belt;
a spring aperture located between the first end and the second end of the body, wherein the spring aperture is located longitudinally away from the first end of the body, wherein the first end of the tensioning spring inserts into the spring aperture;
an attachment juncture located at the raised edge of the side wall of the mounting foot, wherein the hook formed at the second end of the tensioning spring is biased against the raised edge to secure the second end of the tensioning spring against the mounting foot, wherein the raised edge is an edge of the side wall located vertically above the mounting aperture and the base of the mounting foot;
wherein the mounting foot attaches to a first side of the body located laterally of the body, wherein the rotating head attaches to a second side of the body located laterally of the body, wherein the rotating head is located on an opposite side of the body as the mounting foot.

17. The device of claim 16 further comprising:
a mounting leg extending from the first side, wherein the mounting foot pivotally attaches to the mounting leg, wherein the tensioning spring is wound around the mounting leg; a bearing within the rotating head,
wherein the bearing enables rotation of the rotating head along a lateral axis, wherein the bearing is located on the second side of the body located opposite of the mounting leg, wherein the bearing is a self lubricating bearing.

* * * * *